W. H. DENLEY, B. MAKIN & H. B. DENLEY.
MANUFACTURE OF FILES.
APPLICATION FILED SEPT. 26, 1913.
1,165,231.
Patented Dec. 21, 1915.
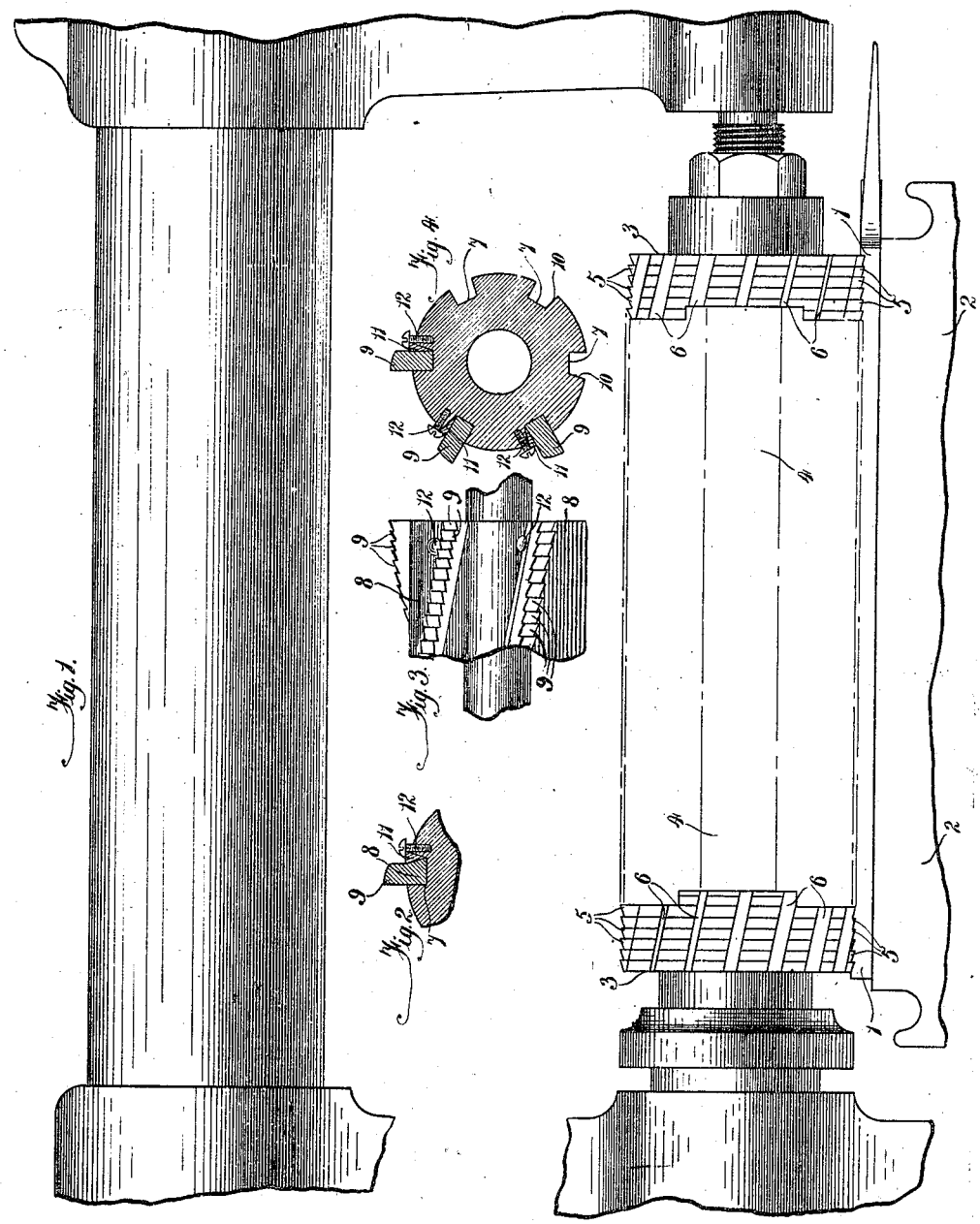
WITNESSES
INVENTORS
W.H.DENLEY, B.MAKIN AND H.B.DENLEY
BY
ATTORNEY

UNITED STATES PATENT OFFICE.

WILLIAM HENRY DENLEY, OF BIRMINGHAM, BENJAMIN MAKIN, OF SHEFFIELD, AND HENRY BERNARD DENLEY, OF BIRMINGHAM, ENGLAND.

MANUFACTURE OF FILES.

1,165,231.  Specification of Letters Patent.  Patented Dec. 21, 1915.

Application filed September 26, 1913. Serial No. 791,962.

*To all whom it may concern:*

Be it known that we, WILLIAM HENRY DENLEY, BENJAMIN MAKIN, and HENRY BERNARD DENLEY, subjects of the King of Great Britain, residing at 378 Moseley road, Birmingham, England, Attercliffe Steel Works, Sheffield, England, and 378 Moseley road, Birmingham, England, respectively, have invented a new and useful Manufacture of Files; and we do hereby declare the following to be a full, clear, and exact description of the same.

Our invention comprises improvements in the manufacture of files, and has for its object to provide a cheap and efficient means whereby a number of files of the type which are provided with "milling" teeth are produced at one operation, or during one movement of the machine.

Referring to the accompanying drawings forming a part hereof: Figure 1 represents one form of milling cutter in position in the slide of a milling machine. Figs. 2, 3, and 4 represent modified forms of the cutters suitable for use according to this invention.

In carrying our invention into practice as illustrated upon the accompanying drawings we secure the file blanks 1 by any suitable means to the slide 2, or an attachment which may be secured to the slide of the milling machine, which is automatically advanced against the milling cutter. The milling tool 3 is carried by the usual spindle 4 and is of a length corresponding with the length of the file to be milled. The pitch of the teeth 5 on the cutter corresponds with the pitch of the file when cut. The cutter is provided with the usual clearance grooves 6 in inclined or spiral relation to the cutter, and each tooth is backed off with suitable clearance. It will be obvious from this that if the slide and cutter move relatively to the required extent the whole series of blanks will be milled during the one movement and without requiring re-setting. In forming the clearance grooves the milled blanks are set up again in similar manner and passed beneath another cutter of suitable shape which mills the clearance grooves of the whole series of files at one operation and setting.

The cutters may be made in one long length corresponding with the length of the file or they may be built up in several sectional lengths to enable them to be employed with files of different lengths. The cutter is preferably composed of sections so that if one part of the cutter is damaged only part of same need to be replaced. If it is desired to mill longer files a section of a suitable length is added.

A modified form of cutter is shown at Figs. 2 and 3. According to this modification instead of forming the cutter teeth directly upon a cylindrical member or body, the cylindrical member is grooved spirally, and into said grooves 7 we secure cutter blades 8 having upon their outer edges a series of cutter teeth 9. The blades are in the form of a long strip one edge of which fits within the grooves 7 while the other and outer edge is backed off, and a row of teeth is cut thereon for the full length of the blade. The front face of the groove is preferably radial in relation to the center of the body, but the rear face may be inclined as at 10, Fig. 4 so that the groove is tapered having a greater width at the periphery than at the bottom of the groove. The blade has a width corresponding with the width of the bottom of the groove, and into the groove at the back of the blade a long wedge 11 or number of short wedges fit, these wedges being adapted to be forced into engagement with the rear face of the blade and to securely lock the blade in position. Screws 12 are provided engaging the said wedges which serve to force same into a locking position. If desired the rear edge of the blade may be undercut to receive the wedge to give greater rigidity. The cutters according to this modification are particularly adapted for use in the manufacture of hand files, that is files in which the cutting surface is slightly curved as distinguished from files which have a straight or flat surface, for the blades may be readily manufactured of this curved form. Any suitable number of these blades may be employed in each cutter, ten or twelve being a convenient number.

By our invention we are enabled to set up a number of files at one setting for milling and thereby materially reduce the cost of production.

What we claim then is:—

1. In a machine for the manufacture of files of the type specified, the combination of a milling machine slide to which a plurality of file blanks are adapted to be secured; and a cutter rotatably supported above the same and having a plurality of spirally arranged rows of relieved teeth adapted to cut a plurality of correspondingly shaped parallel grooves in the blanks, the number of teeth operative in each row being equal to the number of said grooves.

2. In a cutter for the manufacture of files, the combination of a blade of spiral form; and a plurality of cutting teeth upon said blade and inclined thereto so as to cut independent grooves of the full depth of the teeth when the blade is rotated about the axis of the spiral and traversed at right angles to the said axis.

3. In a cutter for the manufacture of files, the combination of a spindle provided with a plurality of spiral groves; a plurality of spiral blades adapted to fit in said groves; a plurality of cutting teeth upon each of said blades and inclined thereto so as to cut independent grooves of the full depth of the teeth when the blade is rotated about the axis of the spiral and traversed at right angles to the said axis; a plurality of spiral wedges adapted to retain said blades in said grooves; and a plurality of screws adapted to tighten said wedges into position.

4. In a cutter for the manufacture of files, the combination of a spindle provided with a plurality of spiral grooves; a plurality of spiral blades adapted to fit in said grooves; a plurality of cutting teeth upon each of said blades and inclined thereto so as to be parallel with a plane perpendicular to the axis of rotation of the cutter and to cut independent grooves of the full depth of the teeth when the blade is rotated about the axis of the spiral; a plurality of spiral wedges adapted to retain said blades in said grooves; and a plurality of screws adapted to tighten said wedges into position.

5. In a cutter for the manufacture of files, the combination of a blade of spiral form; and a plurality of cutting teeth upon said blade and inclined thereto so as to be parallel with a plane perpendicular to the axis of rotation of the cutter and to cut independent grooves of the full depth of the teeth when the blade is rotated about the axis of the spiral.

In testimony whereof, we have signed our names to this specification in the presence of two subscribing witnesses.

WILLIAM HENRY DENLEY.
BENJAMIN MAKIN.
HENRY BERNARD DENLEY.

Witnesses:
HAROLD J. C. FORRESTER,
EVAN L. W. BYRNE.